June 27, 1967 R. W. HATCH, JR 3,327,725
FLUID LOGIC DEAD-BAND CONTROL SYSTEM
Filed June 24, 1964 2 Sheets-Sheet 1
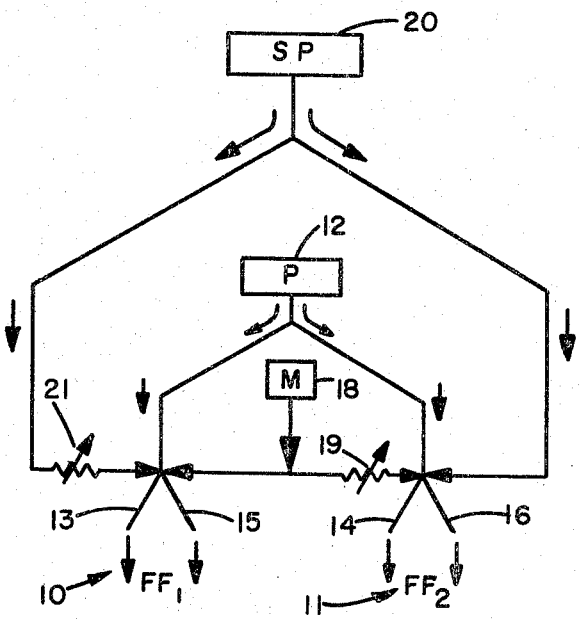
FIG. I
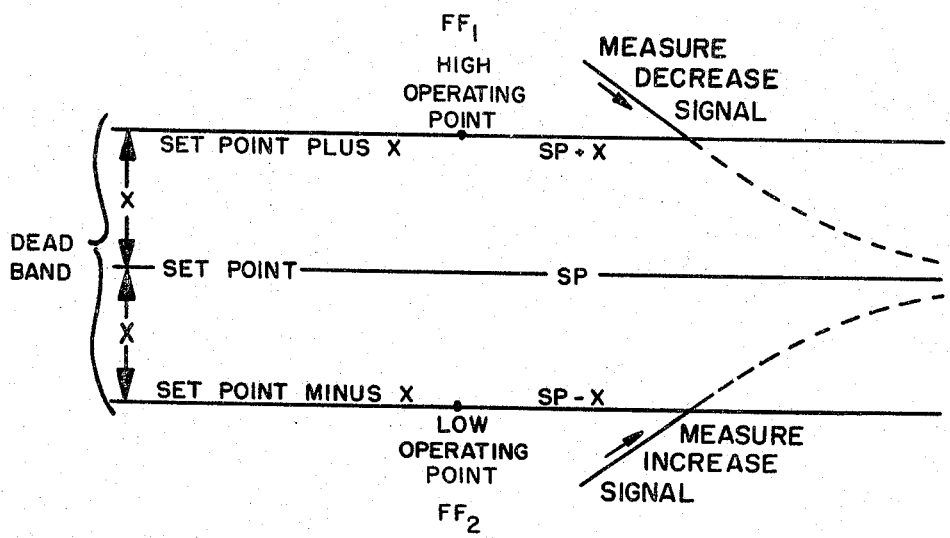
FIG. II
INVENTOR.
RICHARD W. HATCH, JR.
BY
AGENT

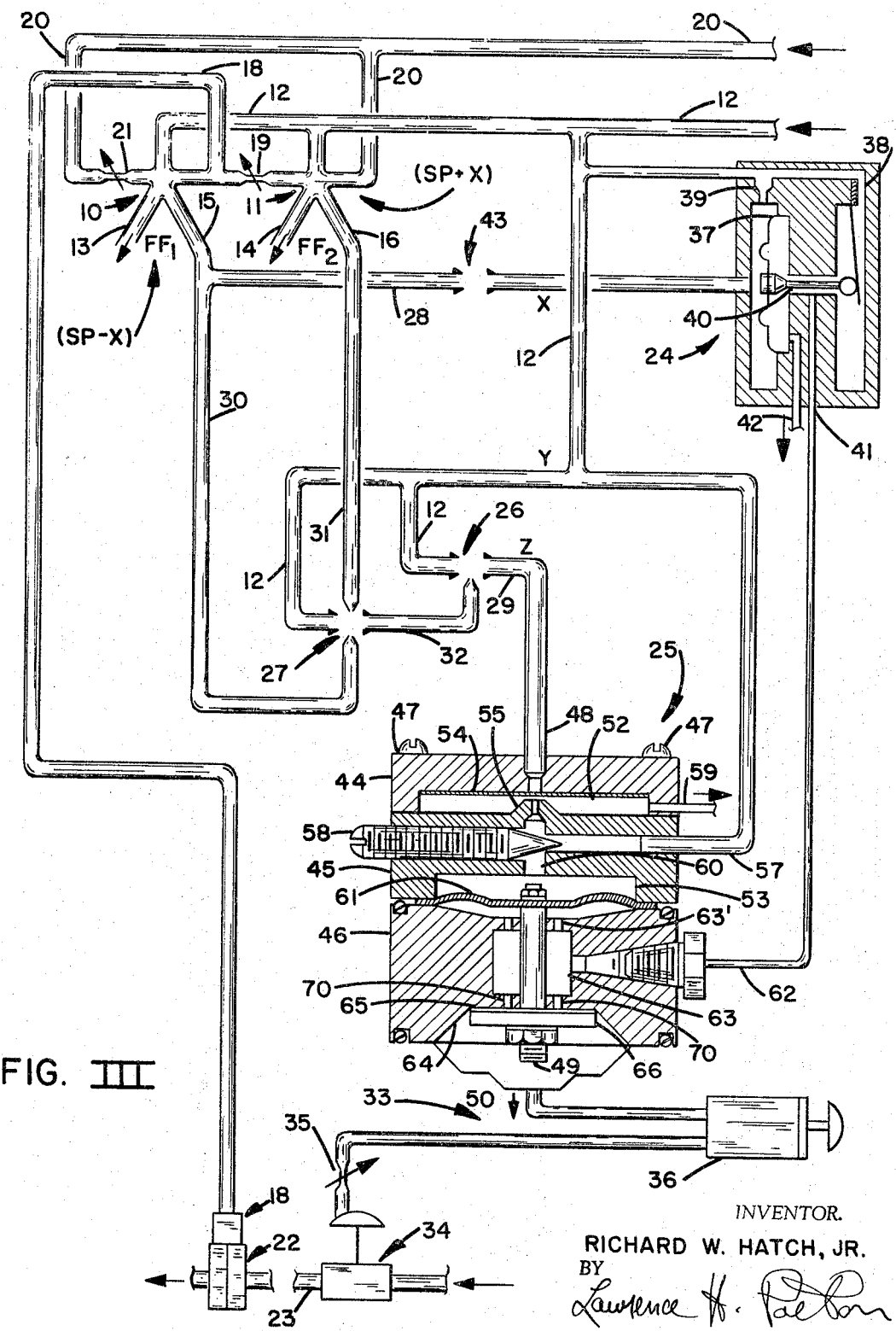
FIG. III
INVENTOR.
RICHARD W. HATCH, JR.
BY
Lawrence H. Patton
AGENT

United States Patent Office 3,327,725
Patented June 27, 1967

3,327,725
FLUID LOGIC DEAD-BAND CONTROL SYSTEM
Richard W. Hatch, Jr., Norwell, Mass., assignor to The Foxboro Company, Foxboro, Mass., a corporation of Massachusetts
Filed June 24, 1964, Ser. No. 377,661
2 Claims. (Cl. 137—81.5)

This invention relates to control systems of the type known as dead-band systems, wherein a control area around the set point is established as a dead-band area within which the measurement signal value may vary without operating the control system.

This form of system avoids undesirable operation of a controller because of a process noise or sharp small upset which would ordinarily produce erratic and unwanted signals.

This invention specifically provides a fluid logic system of the dead-band type wherein this system is operated on a dynamic basis of continually flowing fluids, and also on a digital basis through the binary function of various fluid logic units in the system.

This invention is accomplished in part by the use of a fluid logic flip-flop unit as a means of comparing a set point value with a measured value. In the particular instance of illustration of this invention, a pair of flip-flop units is established in a parallel relation. One unit is arranged to operate a fixed distance above a normal set point and the other unit arranged to operate a fixed distance below a normal set point. The dead-band is between these two limits.

This invention therefore provides a new and novel dead-band control system.

Other objects and advantages of this invention will be in part apparent and in part pointed out hereinafter and in the accompanying drawings, wherein:

FIGURE I is a line schematic showing of the arrangement of flip-flop units with respect to set point, power, and measured signal functions in the device of this invention;

FIGURE II is a graphic showing of the dead-band function of the device of this invention with respect to the illustration of FIGURES I and III; and FIGURE III is a schematic illustration of a dead-band control system according to this invention.

In the FIGURE I illustration there is shown two flip-flop units $FF_1$ and $FF_2$, indicated at 10 and 11 respectively. These flip-flop units are powered from a source 12, and each has a vent outlet respectively at 13 and 14. Each of the flip-flop units $FF_1$ and $FF_2$ have a working output as indicated at 15 and 16 respectively.

A common measurement signal as at 18 is applied to both of the flip-flop units, directly to $FF_1$ and, through a variable restrictor 19, to $FF_2$.

A common set point source is indicated at 20, and is applied to both $FF_1$ and $FF_2$ in opposition to measurement signals from the source 18. This application is direct in the case of $FF_2$ and through a variable restrictor 21, in the case of $FF_1$.

The variable restrictors 19 and 21 provide pressure drops. In the case of $FF_1$, with the restrictor 21 in the set point input line, $FF_1$ will operate when the measurement signal increases to a value which is the set point minus the pressure drop across the restrictor 21. That is, flip-flop $FF_1$ operates at a point which may be designated as set point minus X at a predetermined value (X) below the actual set point value.

Similarly, but oppositely, the measurement signal to the flip-flop $FF_2$ must be above the set point by the amount of the pressure drop in the restrictor 19 in order to operate $FF_2$. Accordingly, $FF_2$ operates at what might be described as set point plus X. X is an arbitrary value and may or may not be the same for restrictors 19 or 21 as desired. In this example twice X is the extent of the dead-band in terms of increase or decrease of measurement signals.

FIGURE II illustrates these relationships with the set point line essentially between the operating point of $FF_2$ above, and the operating point of $FF_1$ below. $FF_1$ operates at set point minus X and $FF_2$ operates at set point plus X. When a measurement signal is increasing, and it reaches set point minus X, $FF_1$ operates and then the signal drifts toward the set point. The reverse is true for $FF_2$, as may be seen in the same FIGURE II illustration.

In the FIGURE III illustration of an embodiment of this invention, in the area of the showing of the $FF_1$ and $FF_2$ flip-flops, and with reference to FIGURE I, like numerals have been applied to like elements. The showing of that part of FIGURE III is the same in structure as that illustrated and described with respect to FIGURE I.

In FIGURE III, the measurement signal source generally indicated at 18 comprises a flow measurement unit 22 which may, for example, be a differential pressure taken across an orifice plate in a flow line 23.

The working outputs of $FF_1$ and $FF_2$, as in the output passages 15 and 16, is applied to a system involving a series arrangement of, at the right of the drawing, a fluid relay 24, followed by a specially formed on-off relay at 25. These relays are both powered from the same source 12 that supplies the power of the flip-flop units $FF_1$ and $FF_2$. This same power source operates a pair of fluid logic diffuser units at 26 and 27. The relay 24 is operable from the output of $FF_1$ by way of passage 15 and passage 28. The relay 25 is actuated from the power source 12 through the diffuser unit 26 and its output passage 29.

The diffuser units 26 and 27 are operable in terms of the combined output of $FF_1$ and $FF_2$, that is, outputs 15 and 16 by way of passages 30 and 31.

The diffuser units 26 and 27 are themselves interoperatively connected in that the power source 12 supplies both the diffuser 26 and the diffuser 27. Thus the diffuser 26 is controllable by means of flip-flop $FF_1$ and $FF_2$ outputs, individually or together and the diffuser 26 is controllable by the output of diffuser 27 by means of a passage 32.

The diffuser units 26 and 27 are fluid logic components which ordinarily have a straight flow there-through from an input to an output, as in diffuser unit 26, from the input 12 to the output 29. However, when a lateral control signal, as in the output 32 from the diffuser 27, is applied to the diffuser 26, the open stream between the input 12 and the output 29 is deflected and is diffused to atmosphere or to a pressure sink, thus cutting off or refusing passage to any signal from passage 12 to output 29. When the signal in passage 32 is removed, the normal flow is automatically resumed through the diffuser 26, from passage 12 to output passage 29. The diffuser 27 operates in a like manner in that the control inputs 30 and 31 are capable of diffusing flow between the inputs 12 and 32, in either direction, so as to prevent the application of the diffuser control signal to the diffuser 26 through the passage 32.

Thus if there is no output in $FF_1$ and $FF_2$ in either passage 15 or 16, then diffuser 27 will be operative. There will be a flow from passage 12 through the diffuser to passage 32, and this flow will diffuse the diffuser 26 so that there can be no flow from the passage 12 to 29. If, on the other hand, there is a flow from either $FF_1$ or $FF_2$ in passages 15 or 16, note that either one will shut off diffuser 27 by signals in passages 30 or 31. When this happens there is no control signal in the passage 32 and diffuser 26 is operative by a signal from passage 12 and passage 29.

The two relays, in series, that is 24 and 25, have an output as indicated at 33, leading to a control valve 34 in the flow line 23. This output has a resistance-capacity series combination therein, with a resistance at 35 and a variable capacity at 36.

Accordingly, in the overall situation, when the measurement signal is below set point minus X, both the relays 24 and 25 are actuated and open, and the valve 34 is open. The valves 24 and 25 are actuated because, with the measurement below the set point in $FF_1$, there is a working output 15, and accordingly a signal in the passage 28 to operate the relay 24. Also there is a signal in the working output 15 through the passage 30 to cut-off flow through the diffuser 27. Therefore, there is no control signal in the output 32, which means that the diffuser 26 is operative from the input 12 to the passage 29 to operate the relay 25.

When the increasing signal reaches the point of set point minus X, that is, the operating point of $FF_1$, both relays 24 and 25 close and the valve drifts toward its set point position as the signal in the resistance-capacity combination of 35 and 36 settles out.

At the point when the increasing measurement signal reaches set point minus X, $FF_1$ operates because the measurement has now reached the effective set point. Both relays close because the output of $FF_1$ is now in the vent and not working output passage 15. Therefore, there is no signal in the output passage 28 and the relay 24 closes. Similarly, the working output 15 of $FF_1$, through the output 30 is removed from the passage 30. The diffuser 27 becomes operative and there is a signal from the passage 12 to the passage 32 to shut off the diffuser 26 and close the valve 25. It is possible to shut off diffuser 27 by a signal in the passage 31 from the $FF_2$, but at the point where the increasing measurement signal reaches set point minus X, the set point in the passage 20 to $FF_2$ is still considerably greater than the measurement signal thereto by way of input passage 18 and resistance 19. That is, $FF_2$ continues to vent its output by passage 14 until the measurement signal either by going through the dead-band, or by reaching it from above, reaches the set point plus X at which $FF_2$ operates.

At the actual set point there is no action because the operating points of $FF_1$ and $FF_2$ are set point minus X and set point plus X respectively. The system is on dead-band operation with both of the relays closed and the valve at whatever position it reaches by way of the final drift of settling out from the resistance-capacity series combination of the units 35 and 36.

In the situation where the measurement signal is above set point plus X, the lower relay 25 is open and the upper relay 24 is mainly closed. The valve 34 is bleeding out through the upper relay 24.

In the situation of the measurement signal being above set point plus X, $FF_1$ will be venting through its output 13, there will be no signal in the passage 28, and the upper relay 24 will be closed. However, since the measurement signal is above set point plus X, $FF_2$ will be operative and will have an output in passage 31 which will shut off diffuser 27. This allows the diffuser 26 to pass a signal from the input 12 to the passage 29. The on-off special relay 25 will be open, and the valve 34 will be able to bleed back through it to the vent in the upper relay 24.

If the measurement signal is above set point plus X, and decreases to the point of set point plus X it will be seen that the lower relay closes. This means that the situation is in the dead-band area again, with both relays closed. The valve then drifts toward the set point by feeding back to the delay combination of the resistance 35 and capacity 36.

The relay 24 is provided with a diaphragm 37 with power from the source 12 directed to one side thereof through passage 38 and to the other side thereof through a restrictor 39. A valve and stem as at 40 are attached to the diaphragm 37 and there is a passage for the power supply through the input 38 to an output 41 from the relay. On the diaphragm side of the relay and on the main power side of the diaphragm there is a vent 42 through which the valve 34 can be vented when the relay 24 is closed and the relay 25 is open. The relay 24 is supplied from the operating output 15 of $FF_1$ through passage 28.

The on-off relay 25 comprises a main body which is made up of a top unit 44, a central unit 45, and a bottom unit 46. These units are held together by vertically disposed corner screws as indicated at 47.

The input to this device is at the top thereof as at 48 in the form of a digital fluid pulse input. The output is in terms of the vertical movement of a shaft 49 at the bottom of the unit. This vertical movement may result in fluid flow-pressure output as indicated by arrow 50.

The unit is provided with two short cylindrical chambers of sustantial radius. One of these is in the top portion 44 at 52, and the other is in the central portion 45 at 53.

The upper chamber 52 has its upper end closed off by a rigid type snap-action diaphragm 54. As the digital pulse is entered at 48 it is applied to the upper surface of the snap-action diaphragm 54. This causes the central portion thereof to snap downwardly a short distance to close off a fluid nozzle 55. This nozzle extends vertically upward into the upper chamber 52 in alignment with the digital pulse input 48. Thus each input pulse closes off the nozzle 55 and in between adjacent pulses the snap-acting diaphragm 54 snaps back upward to its normal position.

Chamber 52 is supplied with fluid flow pressure through a branch power input 57 leading past an adjustable screw threaded restrictor 58 and upward to the nozzle 55. A bleed outlet is provided at 59 from the upper chamber 52 so as to provide a flow through the system which is interrupted when an input digital pulse causes a back pressure in the nozzle system by closing off the nozzle 55 with the snap-acting diaphragm 54.

This back pressure is applied to the lower chamber 53 through a downward passage 60. A transverse flexible diaphragm 61 closes off the bottom portion of the chamber 53 and is movable by such back pressure. The shaft 49 is secured centrally of flexible diaphragm 61. This back pressure on the nozzle 55 causes the diaphragm 61 to move downwardly and consequently results in the vertical movement of the shaft 49.

Power is supplied through a lower input 62 into the central chamber 63 and upward through passages 63' to the underside of the diaphragm 61.

The lower face of the section 46 is provided with a recess 64 with a downwardly facing valve seat 65 therein. A valve disk 66 is mounted on the shaft 49 and seats on the valve surface 65.

When the shaft 49 is moved downward, power supplied through the inlet 62 downward past the valve seating disk 66 into a pressure flow outlet as indicated by the arrow 50. The power is provided with passages 70 from the chamber 63 to the recess 64. This is not an operating force against the disk 66 of any substantial proportion as may be noted from the relatively small diameter of the passages 70. This power is the operating output when it is allowed to pass the disk 66 when the shaft 49 has moved downward to open a passage between the face 65 and the top of the disk 66, into the main recess 64.

This invention therefore provides a new and useful fluid logic dynamic digital control dead-band system.

As many embodiments may be made of the above invention, and as changes may be made in the embodiments set forth above without departing from the scope of the invention, it is to be understood that all matter herein-

I claim:

1. A powered fluid logic system for variable condition value sensing, comprising a parallel arrangement of two fluid logic flip-flop units, means for applying a main fluid power flow to each of said flip-flop units, a pair of oppositely applied lateral control fluid passages in each of said flip-flop units, means for applying the same fluid set point signal to one of said control passages of each of said flip-flop units, means for applying the same fluid variable condition signal to the other of said control passages of each of said flip-flop units, a fluid restrictor as pressure drop means in the variable condition control passage of one of said flip-flop units, and another fluid restrictor as pressure drop means in the set point control passage of the other of said flip-flop units, whereby a variable condition at a specific value above said set point signal results in a working output from one of said flip-flop units, and a variable condition at a specific value below said set point signal results in a working output from the other of said flip-flop units, each said specific value being established by the related one of said fluid restrictors.

2. A fluid logic controller comprising a pair of fluid logic flip-flop units, a pair of fluid logic turbulence units, means connecting said flip-flop units to said turbulence units selectively according to the operation of said flip-flop units, means for controlling said flip-flop units in accordance with a fluid input signal as related to a fluid set signal, and output means controlled from said flip-flop units both through and around said turbulence units, comprising an on-off fluid relay unit with a snap-action minute-movement nozzle-diaphragm signal system, with means for applying a fluid power signal, controlled by the working outputs of said flip-flop units, to the side of said diaphragm opposite said nozzle, with a bleed-vent from the area of the nozzle side of said diaphragm, and a second diaphragm system comprising a main power fluid passage into and out of said unit, a flexible, substantial movement diaphragm, a seatable valve, a rigid connection between said diaphragm and said valve whereby movement of said diaphragm causes said valve to open, said main power passage entering said unit between said second diaphragm and said valve, and exiting through said valve, a fluid passage between said nozzle and the side of said second diaphragm opposite said main power passage, and a secondary power passage entering said unit to said passage between said nozzle and said diaphragm, whereby application of said fluid power signal closes said nozzle resulting in back pressure application to said second diaphragm to open said valve and traverse said main power through said unit.

References Cited

UNITED STATES PATENTS

| | | | |
|---|---|---|---|
| 1,477,645 | 12/1923 | Hall | 137—81.5 X |
| 3,069,088 | 12/1962 | Scharpf | 251—75 X |
| 3,117,593 | 1/1964 | Sowers | 137—81.5 X |
| 3,128,039 | 4/1964 | Norwood | 137—81.5 X |
| 3,199,782 | 8/1965 | Shinn | 137—81.5 X |
| 3,209,774 | 10/1965 | Manion | 137—81.5 |
| 3,238,959 | 3/1966 | Bowles | 137—81.5 |
| 3,246,661 | 4/1966 | Bauer | 137—81.5 |

M. CARY NELSON, *Primary Examiner.*

S. SCOTT, *Assistant Examiner.*